United States Patent
Lee

(10) Patent No.: US 9,929,676 B2
(45) Date of Patent: Mar. 27, 2018

(54) METHOD FOR CONTROLLING THREE PHASE EQUIVALENT VOLTAGE OF MULTILEVEL INVERTER

(71) Applicant: LSIS CO., LTD., Gyeonggi-do (KR)

(72) Inventor: Hak-Jun Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/353,137

(22) Filed: Nov. 16, 2016

(65) Prior Publication Data
US 2017/0244314 A1 Aug. 24, 2017

(30) Foreign Application Priority Data

Feb. 18, 2016 (KR) .......................... 10-2016-0019097

(51) Int. Cl.
*H02M 7/49* (2007.01)
*H02M 5/458* (2006.01)
(Continued)

(52) U.S. Cl.
CPC .............. *H02M 7/49* (2013.01); *H02M 5/458* (2013.01); *H02M 7/44* (2013.01); *H02M 1/084* (2013.01);
(Continued)

(58) Field of Classification Search
CPC ........ H02M 1/084; H02M 5/458; H02M 7/44; H02M 1/32; H02M 2007/4835; H02M 7/49; H02H 7/1225; H02P 29/032
See application file for complete search history.

(56) References Cited

U.S. PATENT DOCUMENTS 6,369,543 B1   4/2002  Masselus et al.
8,050,063 B2 * 11/2011  Wagoner ................. H02M 7/48
                                              318/800
(Continued)

FOREIGN PATENT DOCUMENTS

JP   2000060142 A   2/2000
JP   2002-199738 A  7/2002
(Continued)

OTHER PUBLICATIONS

Search Report dated Aug. 23, 2017 issued in corresponding European Application No. 16193067.2.
(Continued)

*Primary Examiner* — Kyle J Moody
*Assistant Examiner* — Demetries A Gibson
(74) *Attorney, Agent, or Firm* — K&L Gates LLP

(57) ABSTRACT

Provided is a method of controlling a three phase equivalent voltage in a multilevel inverter including sensing a state of each of power cells of the multilevel inverter to determine whether or not failure occurs at each of the power cells, bypassing power cells which are determined as being failed to connect power cells operating normally to each other in series per each phase, calculating an offset voltage value using a phase voltage reference per each phase and a sum of each of direct current (DC) link voltages of the power cells which operate normally and configure each of the phases, and calculating a pole voltage reference per each phase for maintaining an equivalence of a three phase line-to-line output voltage using the phase voltage reference per each phase and the calculated offset voltage.

7 Claims, 8 Drawing Sheets

(51) Int. Cl.
*H02M 7/44* (2006.01)
*H02M 1/084* (2006.01)
*H02M 1/32* (2007.01)
*H02M 7/483* (2007.01)

(52) U.S. Cl.
CPC ...... *H02M 1/32* (2013.01); *H02M 2007/4835* (2013.01)

(56) References Cited

U.S. PATENT DOCUMENTS

| | | | | |
|---|---|---|---|---|
| 9,444,322 | B2* | 9/2016 | Park | H02M 1/12 |
| 9,553,526 | B2* | 1/2017 | Noetzold | H01F 30/04 |
| 9,634,576 | B2* | 4/2017 | Shen | H02M 7/487 |
| 2006/0067092 | A1* | 3/2006 | Nondahl | H02M 5/458 363/37 |
| 2008/0316778 | A1* | 12/2008 | Wagoner | H02M 7/49 363/65 |
| 2014/0078797 | A1* | 3/2014 | Mihalache | H02M 7/49 363/71 |
| 2014/0133198 | A1* | 5/2014 | Koyama | H02J 3/1857 363/40 |
| 2014/0268928 | A1 | 9/2014 | Wei et al. | |
| 2015/0171726 | A1* | 6/2015 | Singh Riar | H02M 7/487 363/65 |
| 2015/0171733 | A1 | 6/2015 | Zargari et al. | |
| 2015/0180369 | A1 | 6/2015 | Nondahl et al. | |
| 2016/0268948 | A1* | 9/2016 | Choi | H02H 7/122 |
| 2017/0123014 | A1* | 5/2017 | Goetz | H02M 7/483 |

FOREIGN PATENT DOCUMENTS

| | | |
|---|---|---|
| JP | 2004-56882 A | 2/2004 |
| JP | 2005253229 A | 9/2005 |
| JP | 2008141804 A | 6/2008 |
| JP | 2010-220332 A | 9/2010 |
| JP | 2012228025 A | 11/2012 |
| JP | 2016171742 A | 9/2016 |
| KR | 10-2009-0044126 A | 5/2009 |
| KR | 10-1025647 B1 | 3/2011 |
| KR | 10-1197793 B1 | 11/2012 |
| KR | 10-1516090 B1 | 5/2015 |

OTHER PUBLICATIONS

Office Action dated Sep. 5, 2017 issued in corresponding Japanese Application No. 2016-222707.
Japanese Notice of Allowance for related Japanese Application No. 2016-222707; action dated Dec. 19, 2017; (3 pages).

* cited by examiner

METHOD FOR CONTROLLING THREE PHASE EQUIVALENT VOLTAGE OF MULTILEVEL INVERTER

CROSS REFERENCE TO RELATED APPLICATION

This application claims the benefit of Korean Patent Application No. 10-2016-0019097, filed on Feb. 18, 2016, entitled "METHOD FOR CONTROLLING THREE PHASE EQUIVALENT VOLTAGE OF MULTILEVEL INVERTER", which is hereby incorporated by reference in its entirety into this application.

BACKGROUND

1. Technical Field

The present disclosure relates to a method for controlling a three phase equivalent voltage of a multilevel inverter, and more particularly, to a voltage control method capable of providing a continuous operation by performing a three phase equivalent voltage control using an offset voltage (or a zero sequence voltage) without bypassing power cells operating normally to maintain an equivalence of a three phase line-to-line output voltage when some of power cells of a cascaded H-bridge (CHB) multilevel inverter are failed.

2. Description of the Related Art

A multilevel inverter has been mainly studied in a field to which a medium voltage is applied, especially, in a field of an electric motor drive.

There is difficulty in applying a voltage source inverter to a variable drive of a large-scale alternating current electric motor requiring over a medium voltage due to limitation to a rated voltage and voltage stress of a switching device that configures an inverter.

A voltage source inverter requiring over medium voltage may be exemplified as a 2-level inverter that has characteristics of equivalent voltage stresses as many as the number of connected switching devices using a serial connection of the switching devices. However, when an electric motor is driven using such a 2-level inverter, it may be difficult to actually apply the 2-level inverter to an industrial field because there are problems such as degradation, insulation and the like of an electric motor caused by a high dv/dt, a voltage reflection, high total harmonic distortion (THD), high switching loss, and the like.

In order to address such problems, a variety kind of multilevel inverters have been being developed, and a cascaded H-bridge (CHB) multilevel inverter among such inverters shows most prominent characteristics in aspects of input and output voltages and current quality. Each phase of the CHB multilevel inverter is implemented through a serial connection of power cells, each of which is configured with a single H-bridge inverter.

The CHB multilevel inverter has advantages including modularization ability, high reliability, operation continuity, low total harmonic distortion (THD) of an input current, and the like. And, by virtue of such advantages, the commercialization of the CHB multilevel inverter has been actively made such that an inverter product for driving a medium voltage electric motor is currently being released by numerous manufacturers.

A power cell of the CHB multilevel inverter is made of a three phase rectifying circuit, a direct current (DC) link capacitor, and an H-bridge circuit, and N power cells are connected in series to form a single phase. When k power cells are failed among the N power cells, the CHB multilevel inverter bypasses the k power cells to enable a continuous operation. Meanwhile, when the k power cells are bypassed at a single phase, non-equivalence occurs in each of line-to-line voltages. In order to address such non-equivalence, the k power cells should be also bypassed at other phases. In such a case, redundancy that the CHB multilevel inverter has inherently is decreased, and also an output voltage is decreased by an amount of (N−k)/N.

SUMMARY

To address the above described problems, an object of the present disclosure is to provide a method for controlling a three phase equivalent voltage of a multilevel inverter capable of providing a continuous operation by performing a three phase equivalent voltage control using an offset voltage (or a zero sequence voltage) without bypassing power cells operating normally to maintain an equivalence of a three phase line-to-line output voltage when a power cell of a cascaded H-bridge (CHB) multilevel inverter is failed.

The object of the present disclosure is not limited to the above described object, and other objects not mentioned above will be apparently understood by those skilled in the art from the following description.

According to one aspect of the present disclosure, it is provided a method of controlling a three phase equivalent voltage of a cascaded. H-bridge (CHB) multilevel inverter including sensing a state of each of power cells of the multilevel inverter to determine whether or not failure occurs at each of the power cells, bypassing power cells which are determined as being failed to connect power cells operating normally to each other in series per each phase, calculating an offset voltage value using a phase voltage reference per each phase and a sum of each of direct current (DC) link voltages of the power cells which operate normally and configure each of the phases, and calculating a is pole voltage reference per each phase, which maintains an equivalence of a three phase line-to-line output voltage, using the phase voltage reference per each phase and the calculated offset voltage.

The calculating of the offset voltage value may calculate the offset voltage value using a difference value between the phase voltage reference per each phase and output values of a bound function which uses the sum of each of the DC link voltages of the power cells which operate normally and configure each of the phases.

The calculating of the offset voltage value may include calculating the sum of each of the DC link voltages of the power cells which operate normally and configure each of the phases, setting the calculated sum of each of the DC link voltages to a maximum value and a minimum value, and outputting the output values of the bound function which receives the phase voltage reference per each phase as an input, calculating a difference value between the phase voltage reference per each phase and each of the output values of the bound function, and accumulating the calculated difference value to output the offset voltage value.

The calculating of the offset voltage value outputs an offset voltage value $V_{sn}$ expressed as the following equation, $$v_{sn} = -(v_{as}^* - v_{as} + v_{bs}^* - v_{bs} + v_{cs}^* - v_{cs})$$ [Equation]

$$v_{as} = \text{bound}(-V_{dc}^a, V_{dc}^a, v_{as}^*)$$

-continued $$v_{bs} = \text{bound}(-V_{dc}^b, V_{dc}^b, v_{bs}^*)$$

$$v_{cs} = \text{bound}(-V_{dc}^c, V_{dc}^c, v_{cs}^*)$$

$$\text{bound}(a, b, x) = \begin{cases} a & (\text{if, } x < a) \\ b & (\text{if, } x > b) \\ c & (\text{if, } a \leq x \leq b) \end{cases}$$

wherein a bound(a,b,x) function outputs an output value of a when x is less than a, outputs an output value of b when x is greater than b, and outputs an output value of x when x is equal to or greater than a, or equal to or less than b, and wherein $V^a_{dc}$, $V^b_{dc}$, and $V^c_{dc}$ are DC link voltages of a, b, and c phases, respectively, and $v^*_{as}$, $v^*_{bs}$, and $v^*_{cs}$ are phase voltage references of the a, b, and c phases, respectively.

The control method of a three phase equivalent voltage in the multilevel inverter may further include generating a switching control signal from the calculated phase voltage reference per each phase through a pulse width modulation (PWM), thereby outputting the switching control signal to each of the power cells.

The calculating of the pole voltage reference may add the phase voltage reference per each phase to the calculated offset voltage value to calculate the pole voltage reference for maintaining the equivalence of the three phase line-to-line output voltage.

In accordance with the present disclosure, the CHB multilevel inverter may inject the offset voltage (or the zero sequence voltage), which is calculated using the phase voltage reference and the limiter, to perform a three phase equivalent voltage control, thereby maintaining an equivalence of a three phase line-to-line output voltage without bypassing power cells operating normally when some of the power cells are failed.

Consequently, the CHB multilevel inverter may not lose redundancy of other phases, and also may output a line-to-line voltage as maximum as possible within a linear control region when all power cells of a single leg are failed as well as several power cells are failed.

DETAILED DESCRIPTION

Figure 1:
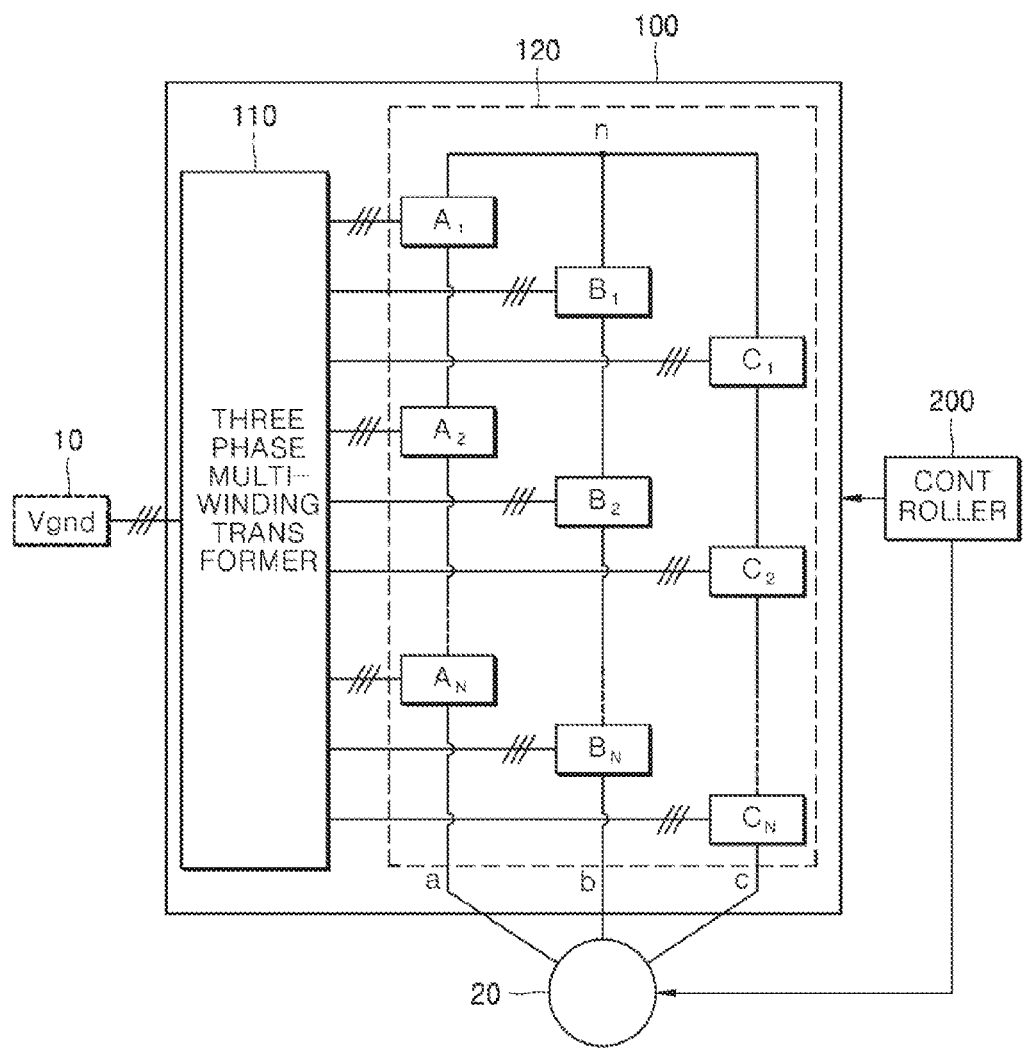
FIG. 1 is a diagram for describing a structure of a cascaded H-bridge (CHB) multilevel inverter according to one embodiment of the present disclosure.

The present disclosure may be variously modified and will have a variety of embodiments so that specific embodiments will be exemplified in the drawings and will be described in detail herein. The specific embodiments disclosed herein, however, are not to be taken in a sense for limiting the present disclosure to these embodiments, but for explanation thereof and it should be understood that numerous other alternations, equivalents and substituents will be falling within the spirit and scope of the present disclosure.

Hereinafter, one preferred embodiment according to the present disclosure will be described in detail with reference to the accompanying drawings.

FIG. 1 is a diagram for describing a structure of a cascaded H-bridge (CHB) multilevel inverter according to one embodiment of the present disclosure.

With reference to FIG. 1, a cascaded H-bridge (CHB) multilevel inverter 100 according to one embodiment of the present disclosure may be configured to include a three phase multi-winding transformer 110 and a plurality of power cells 120, and it is connected between a power source system 10 and an electric motor 20. The CHB multilevel inverter 100 operates under the control of a controller 200.

The three phase multi-winding transformer 110 provides a direct current (DC) link voltage independent from each of the power cells 120. A phase difference exists between windings. This is a reason to provide a rectifying circuit configuring each of the power cells 120 in a multi-pulse form. Owing to such a phase difference, input currents of the power cells 120 are superposed to each other such that an input current of the three phase multi-winding transformer 110 has a low total harmonic distortion (THD).

The plurality of power cells are connected in series per each phase to configure the plurality of power cells 120. Each of the power cells has a structure of a single phase H-bridge inverter configured with a low voltage switching device, and it may obtain over a medium voltage through a serial connection of multiple power cells. And, because the number of levels of an output voltage is increased according to the number of the power cells, an output voltage waveform close to a sinusoidal wave may be obtained. In other words, through a serial connection of multiple power cells, an output voltage waveform over a medium voltage having a very low THD may be obtained.

The controller 200 may control an operation of the CHB multilevel inverter 100. When arbitrary cell in the CHB multilevel inverter 100 is failed, the controller 200 performs a three phase equivalent voltage control by injecting a calculated offset voltage (or a zero sequence voltage) using a phase voltage reference and a limiter, thereby maintaining an equivalence of a three phase line-to-line voltage without bypassing a power cell operating normally when the arbitrary cell is failed.

The CHB multilevel inverter 100 does not lose redundancy of other phases due to such an operation, and it may output a line-to-line voltage as maximum as possible within a linear control region when entire power cells of a single leg are failed as well as several power cells are failed.

Figure 2:
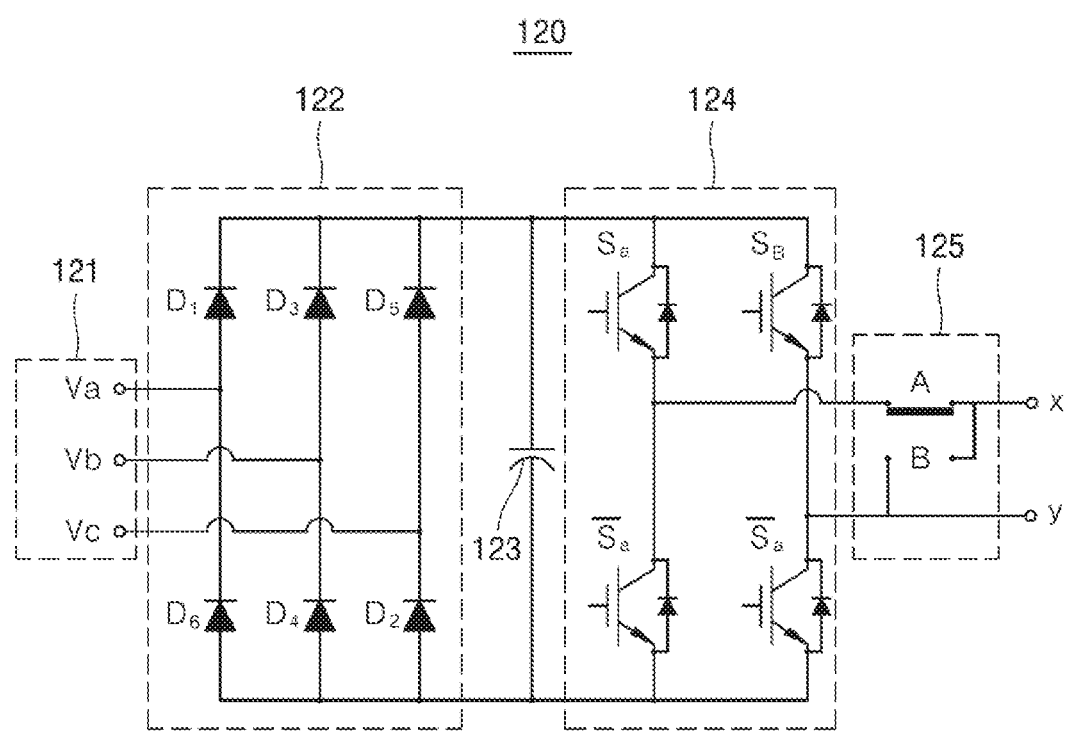
FIG. 2 is a diagram for describing a configuration of a power cell in the CHB multilevel inverter according to one embodiment of the present disclosure.

FIG. 2 is a diagram for describing a configuration of a power cell in a CHB multilevel inverter according to one embodiment of the present disclosure.

With reference to FIG. 2, a power cell 120 is configured to include a power cell input unit 121, a rectifier 122, a smoothing direct current (DC) link capacitor 123, a single phase H-bridge inverter 124, and a bypass contactor 125.

The power cell input unit 121 is connected to an output terminal of the three phase multi-winding transformer 110. The rectifier 121 rectifies a three phase alternating current (AC) voltage applied from the power cell input unit 121 to a DC voltage. The smoothing DC link capacitor 123 smooths a DC link voltage. The single phase H-bridge inverter 124 outputs a single phase voltage. The bypass contactor 125 serves to bypass a power cell when the power cell is failed. The bypass contactor 125 is connected to A when the power cell 120 is in a normal state, whereas it is connected to B when the power cell 120 is failed so that it is necessary to bypass the failed power cell 120.

As described above, because the bypass contactor 125 is provided at an output terminal of each of the power cells 120, a seamless operation may be possible without stopping a system during a replacement of a failed power cell 120 by bypassing the failed power cell 120 when one of the power cells 120 is failed.

Figure 3:
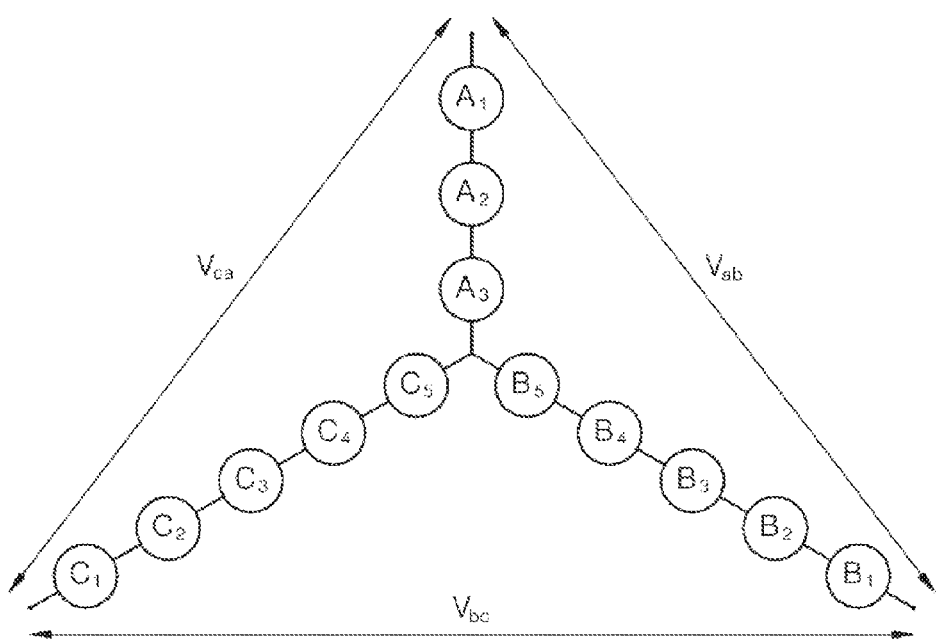
FIG. 3 is a vector diagram illustrating a maximum voltage when an arbitrary power cell is failed in the CHB multilevel inverter according to one embodiment of the present disclosure.

FIG. 3 is a vector diagram illustrating a maximum voltage when an arbitrary power cell is failed in the CHB multilevel inverter according to one embodiment of the present disclosure.

With reference to FIG. 3, when two power cells of a phase are failed in a state that the number of power cells of each phase is five, it can be seen a vector diagram of a maximum voltage being output. A reference numeral 21 represents an output voltage value of a single power cell of a phase, a reference numeral 22 represents an output voltage value of a single power cell of h phase, and a reference numeral 23 represents an output voltage value of a single power cell of c phase. Therefore, line-to-line voltages of $V_{bc}$, $V_{ab}$, and $V_{ca}$ exist.

When phase voltage references of three phase are $v^*_{as}$, $v^*_{bs}$, and $v^*_{cs}$, and an offset voltage (a zero sequence voltage) thereof is $v_{sn}$, each of pole voltage references $v^*_{an}$, $v^*_{bn}$, and $v^*_{cn}$ is made of a sum of the corresponding phase voltage reference and the offset voltage (or the zero sequence voltage), and it may be expressed as Equation 1.

$$v^*_{an}=v^*_{as}+v_{sn},\ v^*_{bn}=v^*_{bs}+v_{sn},\ v^*_{cn}=v^*_{cs}+v_{sn} \quad \text{[Equation 1]}$$

Meanwhile, a maximum voltage outputable from each phase is made of an entire sum of a DC link voltage of each of the power cells, and it may be defined as Equation 2.

$$V^a_{dc}=\sum_{k=1}^{N_a}V^k_{dca},\ V^b_{dc}=\sum_{k=1}^{N_b}V^k_{dcb},\ V^a_{dc}=\sum_{k=1}^{N_c}V^k_{dcc} \quad \text{[Equation 2]}$$

Herein, $V^k_{dca}$ represents a DC link voltage of a single power cell of a phase, and this may be identically applicable to b and c phases.

Figure 4:
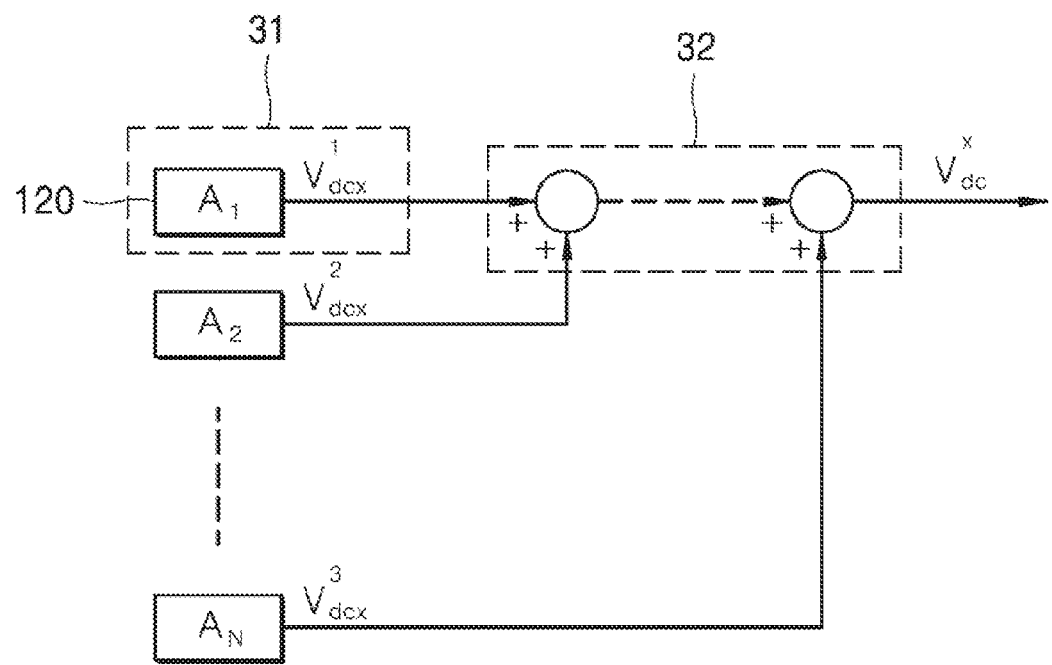
FIG. 4 is a diagram for describing a calculation process of the entire sum of a direct current (DC) link voltage of each of power cells in the CHB multilevel inverter according to one embodiment of the present disclosure.

FIG. 4 is a diagram for describing a calculation process of the entire sum of a DC link voltage of each of power cells in the CHB multilevel inverter according to one embodiment of the present disclosure. With reference to FIG. 4, a DC link voltage of a power cell with respect to each of the power cells is measured (See, Reference Numeral 31). And, voltages of N power cells capable of operating normally are entirely added (See, Reference Numeral 32).

That is, $N_a$ means the number of power cells capable of operating normally among the power cells configuring a phase, and this may be identically applicable to b and c phases.

Consequently, a maximum pole voltage outputtable from each phase may be expressed as Equation 3.

$$-V_{dc}^a \leq v^*_{an} \leq V_{dc}^a,\ -V_{dc}^b \leq v^*_{bn} \leq V_{dc}^b,\ -V_{dc}^c \leq v^*_{cn} \leq V_{dc}^c \quad \text{[Equation 3]}$$

That is, a pole voltage of a phase exists between –a phase DC link voltage and –a phase DC link voltage, a pole voltage of b phase exists between –b phase DC link voltage and +b phase DC link voltage, and a pole voltage of c phase exists between –c phase DC link voltage and +c phase DC link voltage.

Here, a maximum value of each of the DC link voltages is the same as a maximum value obtained by adding the phase voltage reference of a three phase to the offset voltage.

As a result, when arbitrary power cell is failed, maximum pole voltages outputtable from all phases are difference from each other. When an offset voltage capable of satisfying all ranges expressed in Equation 3 is injected, a three phase equivalent maximum pole voltage, that is, a maximum line-to-line voltage may be output within a linear control region.

A maximum value of each of line-to-line voltages may be expressed as Equation 4 using a sum of DC link voltages of power cells configuring each phase.

$$v_{ab}^{max}=V_{dc}^a+V_{dc}^b$$

$$v_{bc}^{max}=V_{dc}^b+V_{dc}^c$$

$$v_{ca}^{max}=V_{dc}^c+V_{dc}^a \quad \text{[Equation 4]}$$

Also, an outputtable line-to-line voltage in an equivalent state may be expressed as Equation 5.

$$v_{ll}^{max}=\min(v_{ab}^{max},\ v_{bc}^{max},\ v_{ca}^{max}) \quad \text{[Equation 5]}$$

In other words, when arbitrary power cell is failed, outputtable line-to-line voltages are different from each other, and, in order to output a three phase equivalent line-to-fine voltage, a Value should be a minimum value among the outputtable line-to-line voltages expressed in Equation 4.

When the line-to-line voltage is limited as in Equation 5, an offset voltage for outputting a three phase equivalent line-to-line voltage is configured as follows.

As in Equation 6, a voltage reference value of each phase may define a value passing a limiter.

$$v_{as}=\text{bound}(-V_{dc}^a,\ V_{dc}^a,\ v^*_{as})$$

$$v_{bs}=\text{bound}(-V_{dc}^b,\ V_{dc}^b,\ v^*_{bs})$$

$$v_{cs}=\text{bound}(-V_{dc}^c,\ V_{dc}^c,\ v^*_{cs}) \quad \text{[Equation 6]}$$

Here, a bound function is a function defined as Equation 7.

$$\text{bound}(a,\ b,\ x)=\begin{cases} a & (\text{if},\ x<a) \\ b & (\text{if},\ x>b) \\ c & (\text{if},\ a\leq x\leq b) \end{cases} \quad \text{[Equation 7]}$$

That is, a bound(a,b,x) function is a function outputting a as an output value when x is less than a, b as an output value when x is greater than b, and x as an output value when x is equal to or greater than a, or equal to or less than b.

Using such a function, an offset voltage may be expressed as Equation 8.

$$v_{sn} = -(v^*_{as} - v_{as} + v^*_{bs} - v_{bs} + v^*_{cs} - v_{cs})$$ [Equation 8]

As expressed in Equation 8, when an offset voltage is injected, the CHB multilevel inverter 100 may output a maximum three phase equivalent line-to-line voltage when a power cell is failed. Such an offset voltage calculation method may be identically applicable to a normal operation state.

When there is no failure in a power cell, an offset voltage reference of '0' is output so that only a phase voltage reference is included in a pole voltage reference. On the other hand, when arbitrary power cell is failed, a pole voltage reference in which an offset voltage is included in a phase voltage reference is produced.

That is, by adding the offset voltage calculated from Equation 8 to the original phase voltage reference, the pole voltage references $v^*_{an}$, $v^*_{bn}$, and $v^*_{cn}$ of three phases expressed in Equation 1 may be produced.

Figure 5:
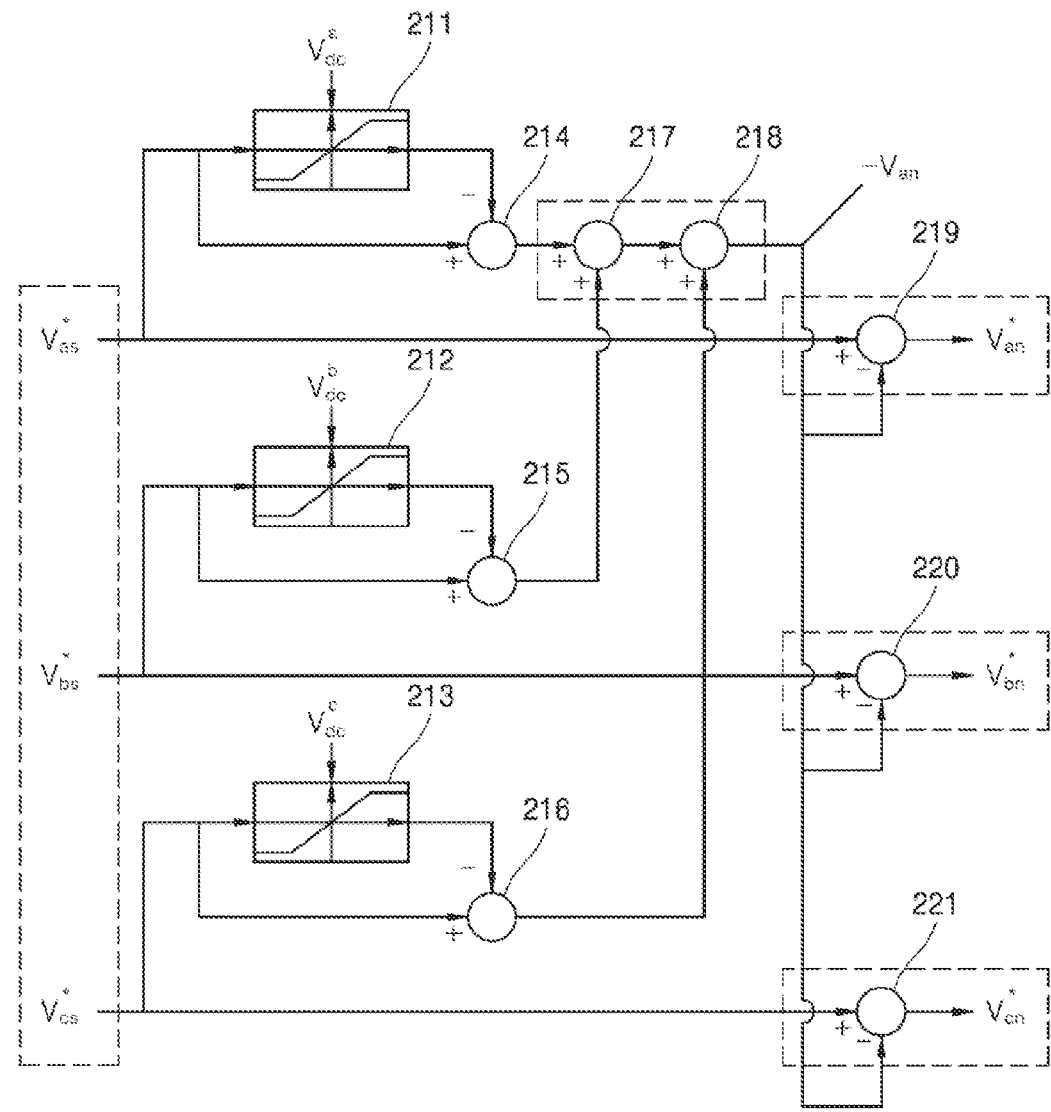
FIG. 5 is a diagram for describing a control method of a three phase equivalent voltage in the CHB multilevel inverter according to one embodiment of the present disclosure.

FIG. 5 is a diagram for describing a control method of a three phase equivalent voltage in the CHB multilevel inverter according to one embodiment of the present disclosure.

A first limiter 211 is a phase voltage limiter of a phase. A second limiter 212 is a phase voltage limiter of b phase. A third limiter 213 is a phase voltage limiter of c phase. Here, a maximum limit value and a minimum limit value of each of the first limiter 211, the second limiter 212, and the third limiter 213 may be represented by a sum of DC link voltages of power cells that are operable with an outputtable maximum voltage being calculated in FIG. 4.

Therefore, a maximum value of the first limiter 211 is $V^a_{dc}$ and a minimum value thereof is $-V^a_{dc}$, a maximum value of the second limiter 212 is $V^b_{dc}$ and a minimum value thereof is $-V^b_{dc}$, and a maximum value of the third limiter 213 is $V^c_{dc}$ and a minimum value thereof is $-V^c_{dc}$. These values are calculated by Equation 2.

A first calculator 214 calculates a difference between a phase voltage reference of a phase and the phase voltage reference of a phase which passed the first limiter 211. Similarly, the second calculator 215 calculates a difference between a phase voltage reference of b phase and the phase voltage reference of b phase which passed the second limiter 212. In similar, a third calculator 216 calculates a phase voltage reference of c phase and the phase voltage reference of c phase which passed the second limiter 213.

A fourth calculator 217 accumulates the calculated value of the first calculator 214 and the calculated value of the second calculator 215. A fifth calculator 218 accumulates the calculated value of the fourth calculator 217 and the calculated value of the third calculator 216. Here, the calculated value of the fifth calculator 218 is calculated as a negative value of the offset voltage.

A sixth calculator 219 calculates a difference between a negative offset value that is the calculated value of the fifth calculator 218 and the phase voltage reference of a phase, thereby outputting a voltage corresponding to the calculated difference as a pole voltage reference $v^*_{an}$ of a phase.

A seventh calculator 220 calculates a difference between the negative offset value that is the calculated value of the fifth calculator 218 and the phase voltage reference of b phase, thereby outputting a voltage corresponding to the calculated difference as a pole voltage reference $v^*_{bn}$ of b phase.

An eighth calculator 221 calculates a difference between the negative offset value that is the calculated value of the fifth calculator 218 and the phase voltage reference of c phase, thereby outputting a voltage corresponding to the calculated difference as a pole voltage reference $v^*_{cn}$ of c phase.

That is, the calculation of each of the sixth calculator 219, the seventh calculator 220, and the eighth calculator 221 is expressed in Equation 1.

Figure 7:
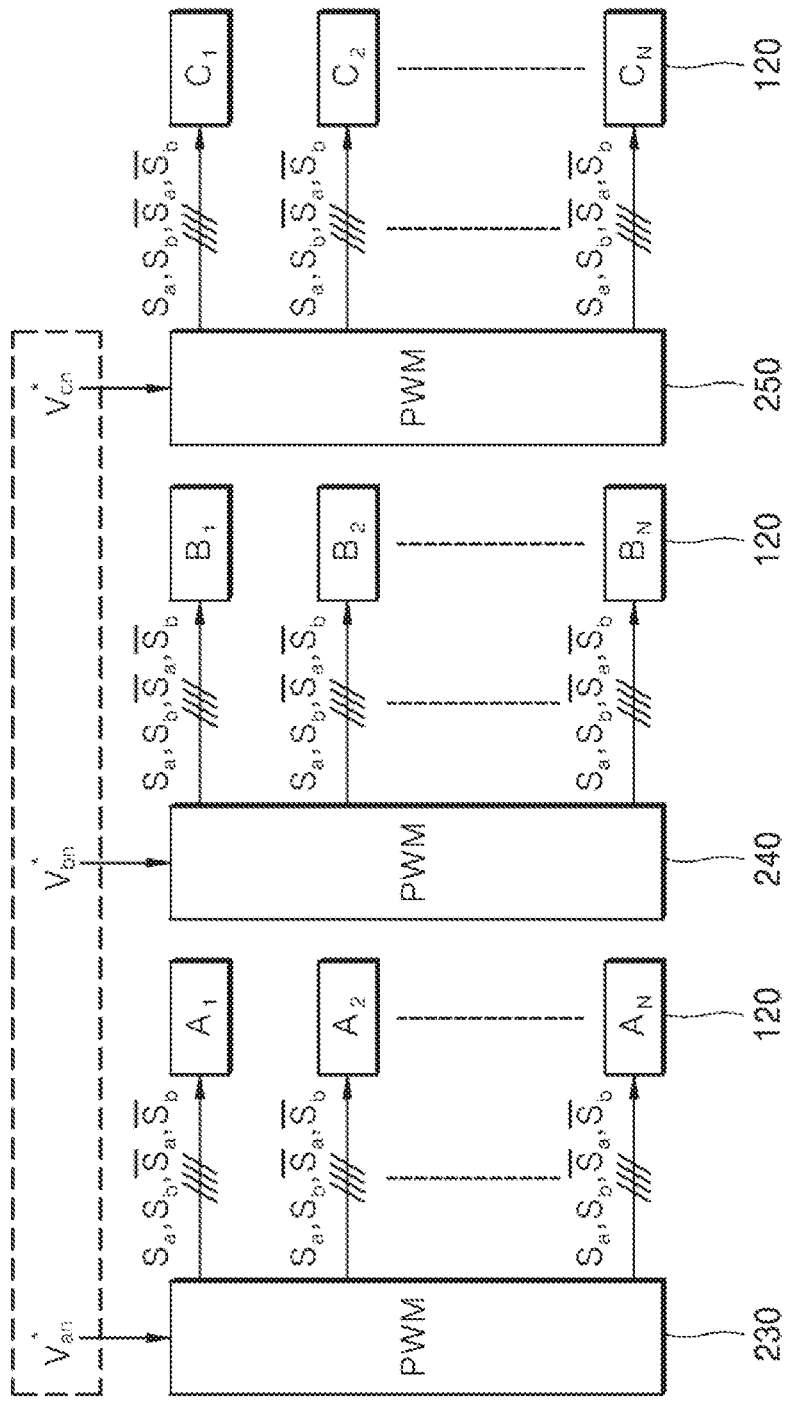
FIG. 7 is a diagram for describing that a pole voltage reference being applied to each phase of the CHB multilevel inverter is transmitted to each cell.

FIG. 7 is diagram for describing that a pole voltage reference being applied to is each phase of the CHB multilevel inverter is transmitted to each of the power cells.

With reference to FIG. 7, a pole voltage reference is applied from the controller 200 and is expressed as $v^*_{an}$, $v^*_{bn}$, and $v^*_{cn}$. The pole voltage reference is expressed as a sum of a phase voltage reference and an offset voltage or a zero sequence voltage.

Pulse width modulation (PWM) modules 230, 240, and 250 receive pole voltage references and generate switch control signals $S_a$, $S_b$, $\overline{S_a}$, $\overline{S_b}$ through a PWM method to output them to each of power cells.

Figure 6:
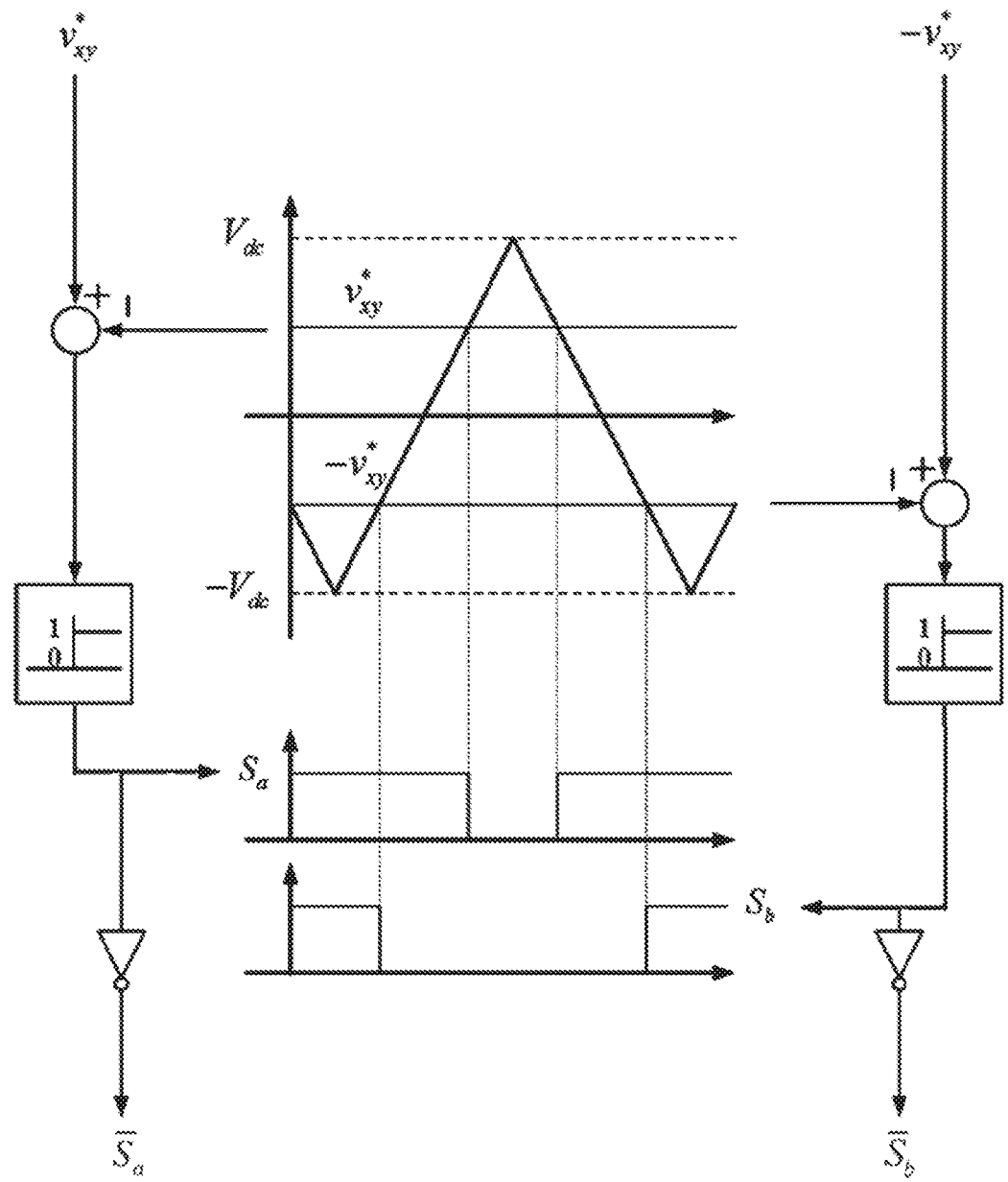
FIG. 6 is diagram for describing generation of a switching control signal from a pole voltage reference in the CHB multilevel inverter according to one embodiment of the present disclosure.

FIG. 6 is diagram for describing generation of a switching control signal from a pole voltage reference in the CHB multilevel inverter according to one embodiment of the present disclosure.

At this point, when a pole voltage reference is representatively expressed as $v^*_{xy}$, the PWM modules 230, 240, and 250 compare a pole voltage reference $v^*_{xy}$ with a triangular wave of a DC link voltage $V_{dc}$ and generate the switch control signals $S_a$, $S_b$, $\overline{S_a}$, $\overline{S_b}$, thereby outputting them to each of the power cells.

More particularly, the PWM modules 230, 240, and 250 compare each of a pole voltage reference $v^*_{xy}$ and a negative pole voltage reference $-v^*_{xy}$ with a triangular wave of a DC link voltage $V_{dc}$ and generate switching control signals $S_a$ and $S_b$ according to the comparison results.

For example, when the pole voltage reference $v^*_{xy}$ is equal to or greater than the triangular wave of the DC link voltage $V_{dc}$, the PWM modules 230, 240, and 250 generate the switching control signal $S_a$ of "1" to output it to each of the power cells. On the other hand, when the pole voltage reference $v^*_{xy}$ is less than the triangular wave of the DC link voltage $V_{dc}$, the PWM modules 230, 240, and 250 generate the switching control signal $S_a$ of "0" to output it to each of the power cells.

Also, when the negative pole voltage reference $-v^*_{xy}$ is equal to or greater than the triangular wave of the DC link voltage $V_{dc}$, the PWM modules 230, 240, and 250 generate the switching control signal $S_b$ of "1" to output it to each of the power cells. On the other hand, when the negative pole voltage reference $-v^*_{xy}$ is less than the triangular wave of the DC link voltage $V_{dc}$, the PWM modules 230, 240, and 250 generate the switching control signal $S_b$ of "0" to output it to each of the power cells.

Thereafter, the PWM modules 230, 240, and 250 generate switching control signals $\overline{S_a}$, $\overline{S_b}$ having a complementary relationship with respect to the generated switching control signals $S_a$ and $S_b$, thereby outputting them to each of the power cells.

According to the switching control signals $S_a$, $S_b$, $\overline{S_a}$, $\overline{S_b}$ output from the PWM modules 230, 240, and 250, ON/OFF operations of switching elements provided in each power cell are determined.

Figure 8:
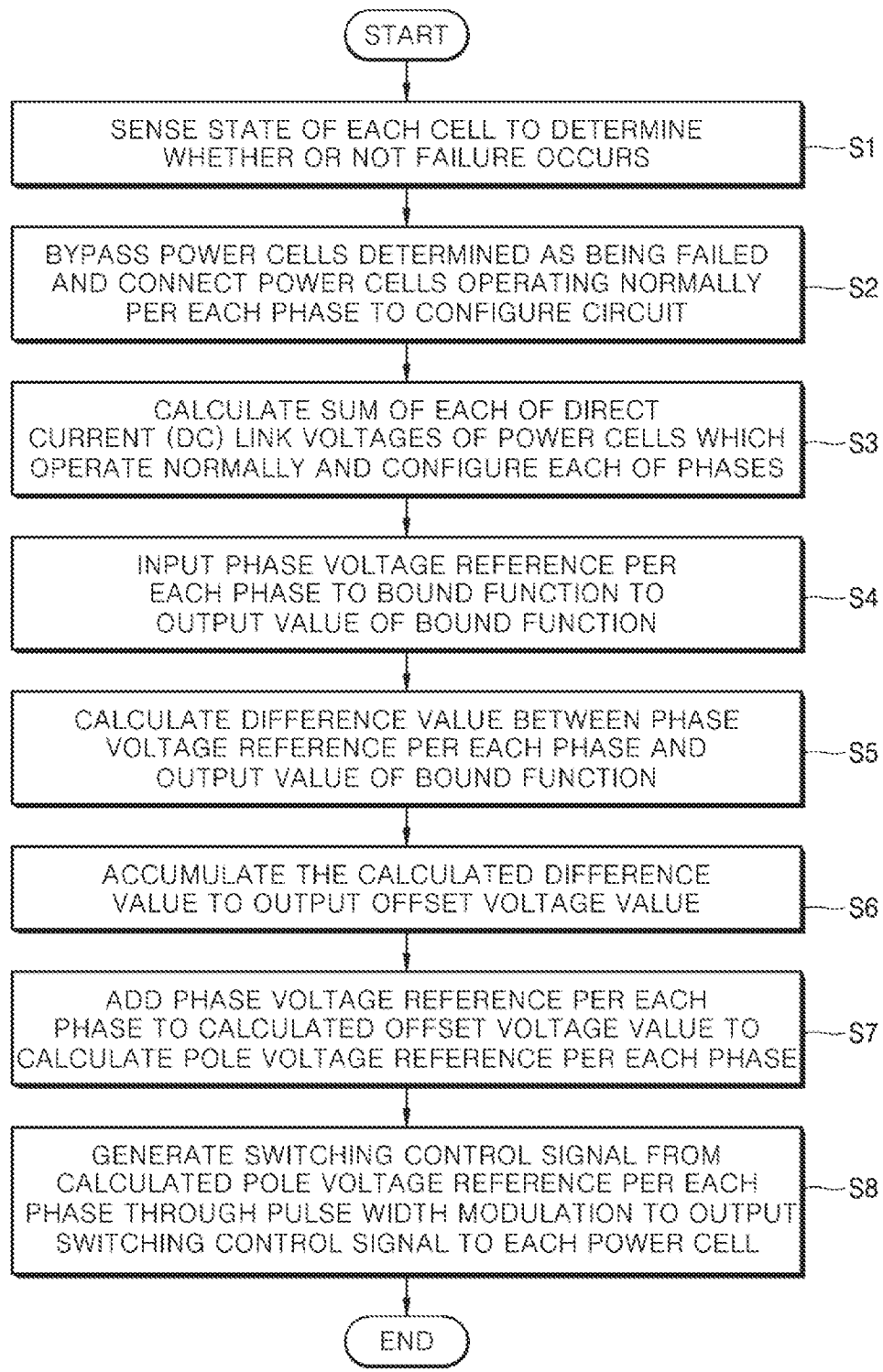
FIG. 8 is a diagram for describing a control method of a three phase equivalent voltage of the CHB multilevel inverter according to one embodiment of the present disclosure.

FIG. 8 is a diagram for describing a control method of a three phase equivalent voltage of the CHB multilevel inverter according to one embodiment of the present disclosure.

With reference to FIG. 8, the controller 200 senses a state of each of the power cells 120 of the CHB multilevel inverter 100 to determine whether or not failure occurs in the power cells 120 in Operation S1.

The controller 200 bypasses power cells 120 being failed and connects power cells 120 operating normally to each phase to configure a circuit in Operation S2.

The controller 200 calculates a sum of DC link voltages of the power cells operating normally and configuring each phase in Operation S3. Here, an entire sum of the DC link voltage of each of the power cells is a maximum voltage that is able to be output at each phase. Consequently, an outputtable maximum voltage of a phase, an outputtable maximum voltage of b phase, and an outputtable maximum voltage of c phase are calculated. Here, the calculated sum of the DC link voltages at each phase is set to a maximum value and a minimum value of the bound function.

The controller 200 inputs a phase voltage reference of each phase to the bound function, thereby outputting an output value of the bound function at each phase in Operation S4. The output value of the bound function is such that a phase voltage reference of each phase is limited by the maximum value and the minimum value of the bound function.

A phase voltage reference of a phase is input to the bound function so that a limited phase voltage reference of a phase is calculated as an output value of the bound function. Similarly, a phase voltage reference of b phase is input to the bound function so that a limited phase voltage reference of b phase is calculated as an output value of the bound function. In similar, a phase voltage reference of c phase is input to the bound function so that a limited phase voltage reference of c phase is calculated as an output value of the bound function.

The controller 200 calculates a difference value between the phase voltage reference of each phase and the output value of the bound function thereof in Operation S5.

Through such a calculation, a difference between the phase voltage reference of a phase and the limited phase voltage reference of a phase is calculated to output a first value. Similarly, a difference between the phase voltage reference of b phase and the limited phase voltage reference of b phase is calculated to output a second value. In similar, a difference between the phase voltage reference of c phase and the limited phase voltage reference of c phase is calculated to output a third value The controller 200 accumulates the calculated difference values to output an offset voltage value in Operation S6. That is, the offset voltage value is calculated by accumulating a value calculated from the difference between the phase voltage reference of each phase and the limited phase voltage reference thereof. Therefore, the first value is accumulated with the second value and the third value.

The controller 200 adds the phase voltage reference of each phase to the calculated offset voltage value to calculate a pole voltage reference of each phase in Operation S7. Therefore, the phase voltage reference of a phase and the offset voltage value thereof are added with each other so that the pole voltage reference of a phase is calculated. Similarly, the phase voltage reference of h phase and the offset voltage value thereof are added with each other so that the pole voltage reference of b phase is calculated. In similar, the phase voltage reference of c phase and the offset voltage value thereof are added with each other so that the pole voltage reference of h phase is calculated.

The controller 200 generates a switching control signal from such a calculated pole voltage reference of each phase through a PWM to output the switching control signal to each of the power cells in Operation S8.

As described above, when arbitrary power cell is failed, the CHB multilevel inverter 100 may inject the offset voltage (or the zero sequence voltage), which is calculated using the phase voltage reference and the limiter, to perform a three phase equivalent voltage control, thereby maintaining an equivalence of a three phase line-to-line output voltage without bypassing power cells operating normally when some of the power cells are failed.

Consequently, the CHB multilevel inverter 100 may not lose redundancy of other phases, and also may output a line-to-line voltage as maximum as possible within a linear control region when all power cells of a single leg are failed as well as several power cells are failed.

The present disclosure has been described with reference to the embodiments shown in the drawings, but is merely an illustration, and it should be understood that numerous other modifications and equivalent other embodiments can be devised by those skilled in the art. Therefore, the technical scope of the present invention should be defined by the appended claims.

What is claimed is:

1. A method of controlling a three phase equivalent voltage of a multilevel inverter, comprising:
   sensing a state of each of power cells of the multilevel inverter to determine whether or not failure occurs at each of the power cells;
   bypassing power cells which are determined as being failed to connect power cells operating normally to each other in series per each phase;
   calculating an offset voltage value using a phase voltage reference per each phase and a sum of each of direct current (DC) link voltages of the power cells which operate normally and configure each of the phases; and
   calculating a pole voltage reference per each phase, which maintains an equivalence of a three phase line-to-line output voltage, using the phase voltage reference per each phase and the calculated offset voltage,
   wherein the calculating of the offset voltage value calculates the offset voltage value using a difference value between the phase voltage reference per each phase and output values of a bound function which uses the sum of each of the DC link voltages of the power cells which operate normally and configure each of the phases.

2. The method of claim 1, wherein the output values of the bound function are expressed as the following equation, $$v_{as} = \text{bound}(-V_{dc}^a, V_{dc}^a, v_{as}^*)$$
$$v_{bs} = \text{bound}(-V_{dc}^b, V_{dc}^b, v_{bs}^*)$$
$$v_{cs} = \text{bound}(-V_{dc}^c, V_{dc}^c, v_{cs}^*)$$
$$\text{bound}(a, b, x) = \begin{cases} a & (\text{if, } x < a) \\ b & (\text{if, } x > b) \\ c & (\text{if, } a \leq x \leq b) \end{cases}, \quad \text{[Equation]}$$

wherein a bound(a,b,x) function outputs an output value of a when x is less than a, outputs an output value of b when x is greater than b, and outputs an output value of x when x is equal to or greater than a, or equal to or less than b, and wherein $V^a_{dc}$, $V^b_{dc}$, and $V^c_{dc}$ are DC link voltages of a, b, and c phases, respectively, and $v^*_{as}$, $v^*_{bs}$, and $v^*_{cs}$ are phase voltage references of the a, b, and c phases, respectively.

3. The method of claim 1, wherein the calculating of the offset voltage value includes:
  calculating the sum of each of the DC link voltages of the power cells which operate normally and configure each of the phases;
  setting the calculated sum of each of the DC link voltages to a maximum value and a minimum value, and outputting the output values of the bound function which receives the phase voltage reference per each phase as an input;
  calculating a difference value between the phase voltage reference per each phase and each of the output values of the bound function; and
  accumulating the calculated difference value to output the offset voltage value.

4. The method of claim 3, wherein the calculating of the offset voltage value outputs an offset voltage value $V_{sn}$ expressed as the following equation,

[Equation]

$$v_{sn} = -(v_{as}^* - v_{as} + v_{bs}^* - v_{bs} + v_{cs}^* - v_{cs})$$

$$v_{as} = \text{bound}(-V_{dc}^a, V_{dc}^a, v_{as}^*)$$

$$v_{bs} = \text{bound}(-V_{dc}^b, V_{dc}^b, v_{bs}^*)$$

$$v_{cs} = \text{bound}(-V_{dc}^c, V_{dc}^c, v_{cs}^*)$$

$$\text{bound}(a, b, x) = \begin{cases} a & (\text{if}, x < a) \\ b & (\text{if}, x > b) \\ c & (\text{if}, a \le x \le b) \end{cases}$$

wherein a bound(a,b,x) function outputs an output value of a when x is less than a, outputs an output value of b when x is greater than b, and outputs an output value of x when x is equal to or greater than a, or equal to or less than b, and wherein $V^a_{dc}$, $V^b_{dc}$, and $V^c_{dc}$ are DC link voltages of a, b, and c phases, respectively, and $v^*_{as}$, $v^*_{bs}$, and $v^*_{cs}$ are phase voltage references of the a, b, and c phases, respectively.

5. The method of claim 1, further comprising:
  generating a switching control signal from the calculated phase voltage reference per each phase through a pulse width modulation (PWM), thereby outputting the switching control signal to each of the power cells.

6. The method of claim 1, wherein the calculating of the pole voltage reference adds the phase voltage reference per each phase to the calculated offset voltage value to calculate the pole voltage reference for maintaining the equivalence of the three phase line-to-line output voltage.

7. The method of claim 6, wherein the calculating of the pole voltage reference calculates the pole voltage reference expressed as the following Equation,

[Equation]

$$v^*_{an} = v^*_{as} + v_{sn}, \ v^*_{bn} = v^*_{bs} + v_{sn}, \ v^*_{cn} = v^*_{cs} + v_{sn}$$

$$v_{sn} = -(v^*_{as} - v_{as} + v^*_{bs} - v_{bs} + v^*_{cs} - v_{cs}),$$

wherein $v^*_{an}$, $v^*_{bn}$, and $v^*_{cn}$ are pole voltage references of a, b, and c phases, respectively, $v^*_{as}$, $v^*_{bs}$, and $v^*_{cs}$ are phase voltage references of a, b, and c phases, respectively, and $v_{sn}$ is an offset voltage.

* * * * *